Oct. 30, 1923.
B. FORD
1,472,391
TERMINAL SEAL FOR STORAGE BATTERIES
Filed June 15, 1920
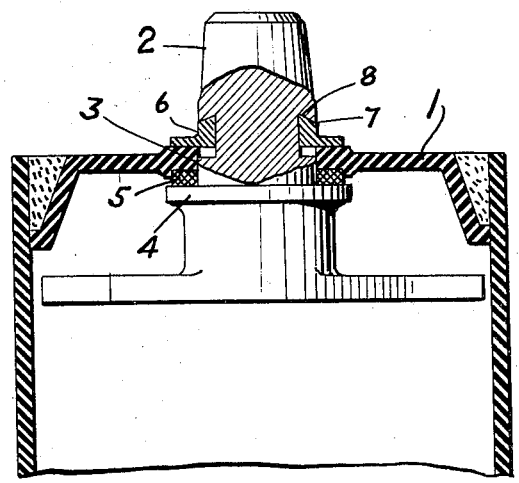
FIG.1.
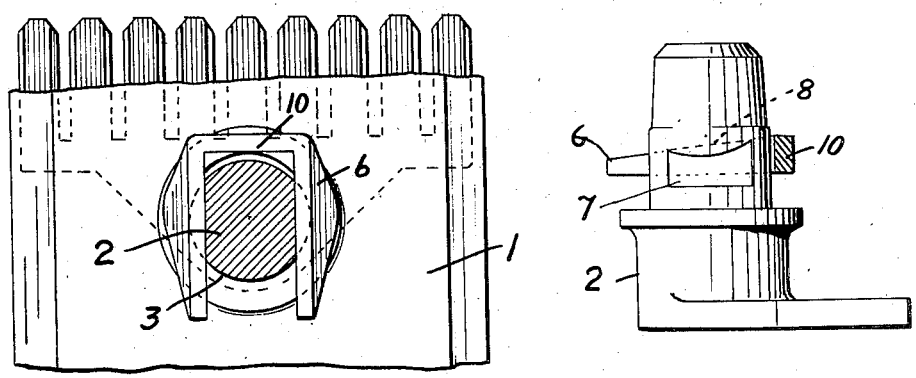
FIG.2.
FIG.3.
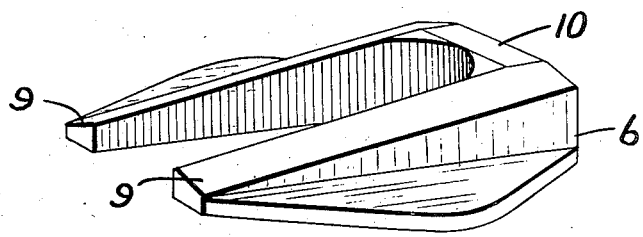
FIG.4.
WITNESS:
INVENTOR
Bruce Ford
BY
ATTORNEY.

Patented Oct. 30, 1923.

1,472,391

UNITED STATES PATENT OFFICE.

BRUCE FORD, OF PHILADELPHIA, PENNSYLVANIA.

TERMINAL SEAL FOR STORAGE BATTERIES.

Application filed June 15, 1920. Serial No. 389,196.

*To all whom it may concern:*

Be it known that I, BRUCE FORD, a citizen of the United States, residing at Philadelphia, in the county of Philadelphia and State of Pennsylvania, have invented a certain new and useful Terminal Seal for Storage Batteries, of which the following is a specification.

The principal object of the present invention is to provide for sealing the aperture in the cover through which the terminal post of the plate structure passes and the invention, generally stated, comprises wedge means arranged between and co-operating with the post and cover for holding in compression a gasket arranged on the post and interposed between the under face of the cover and a shoulder on the post.

In the drawings—

Figure 1, is a transverse sectional view of a terminal seal for storage batteries embodying features of the invention.

Fig. 2, is a top or plan view, partly in section, of the same.

Fig. 3, is a side view of the terminal post showing a section of the wedge means in the position it occupies although parts with which it co-operates are not shown, and Fig. 4, is a perspective view of the wedge structure detached.

In the drawings 1, is an apertured cell or jar cover. 2, is a terminal post for a set of battery plates and it passes through the aperture 3, in the cover and is formed with a shoulder 4, underneath the cover. 5, is a soft packing gasket interposed between the shoulder 4 and the under face of the cover. 6, is a transverse wedge engaging the post and cover for holding the gasket under compression. The post 2, is provided with inclined lateral notches 7, shown as undercut at 8, Fig. 1, and the wedges are provided for co-operation with the notches 7 and cover 1, and these wedges are shown as beveled at 9, and connected by a U-shaped yoke 10, Fig. 4. The object of under-cutting the notches and beveling the wedges is to hold the latter in towards the post.

I claim:

1. In a terminal seal for storage batteries the combination of an apertured cell cover, a terminal post for a set of battery plates passing through the aperture in said cover and formed with a shoulder underneath the cover and with a pair of lateral notches above the cover, a soft packing gasket interposed between said shoulder and cover, and a U-shaped yoke having wedge arms respectively engaging said cover and notches for holding the gasket under compression, substantially as described.

2. In a terminal seal for storage batteries the combination of an apertured cell cover, a terminal post for a set of battery plates passing through the aperture in said cover and formed with a shoulder underneath the cover and with a pair of lateral undercut notches above the cover, a soft packing gasket interposed between said shoulder and cover, and a U-shaped yoke having beveled wedge arms respectively engaging said cover and notches for holding the gasket under compression, substantially as described.

3. In a terminal seal for storage batteries the combination of an apertured cell cover, a terminal post for a set of battery plates passing through the aperture in said cover and formed with a shoulder underneath the cover and with a pair of lateral notches above the cover, a soft packing gasket interposed between said shoulder and cover, and a pair of wedges respectively engaging said cover and notches for holding the gasket under compression.

4. In a terminal seal for storage batteries the combination of an apertured cell cover, a terminal post for a set of battery plates passing through the aperture in said cover and formed with a shoulder underneath the cover and with a pair of lateral undercut notches above the cover, and a pair of beveled wedges respectively engaging said cover and undercut notches for holding the gasket under compression.

BRUCE FORD.